Figure 23:
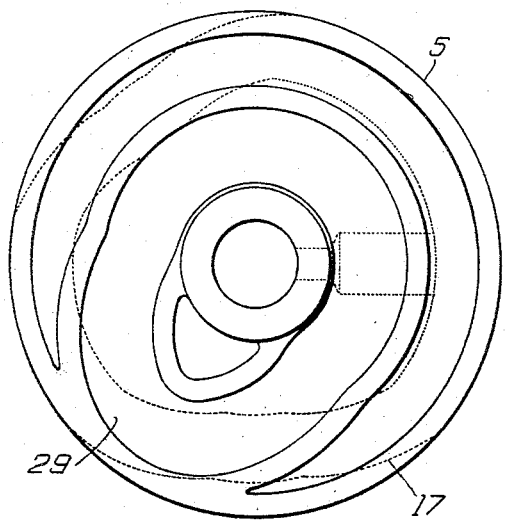

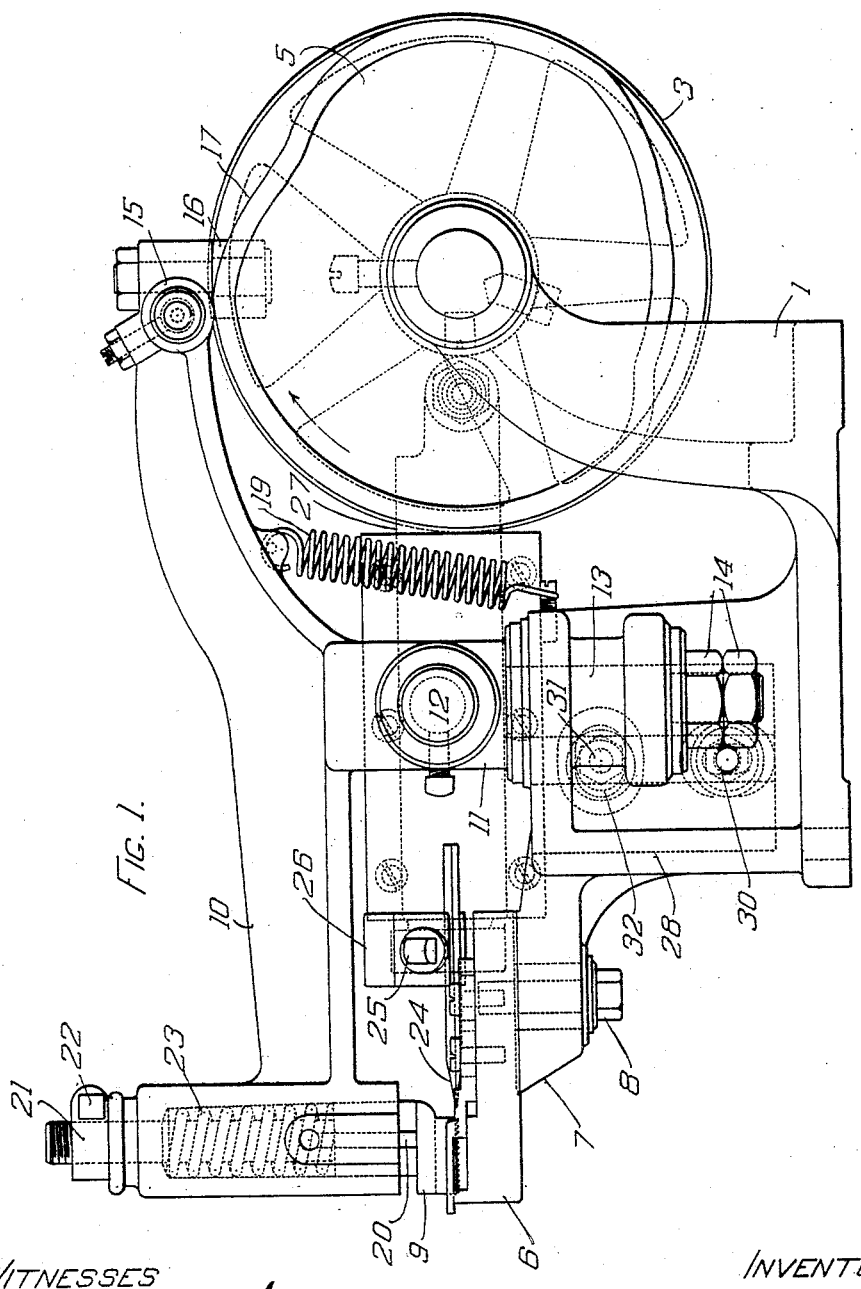

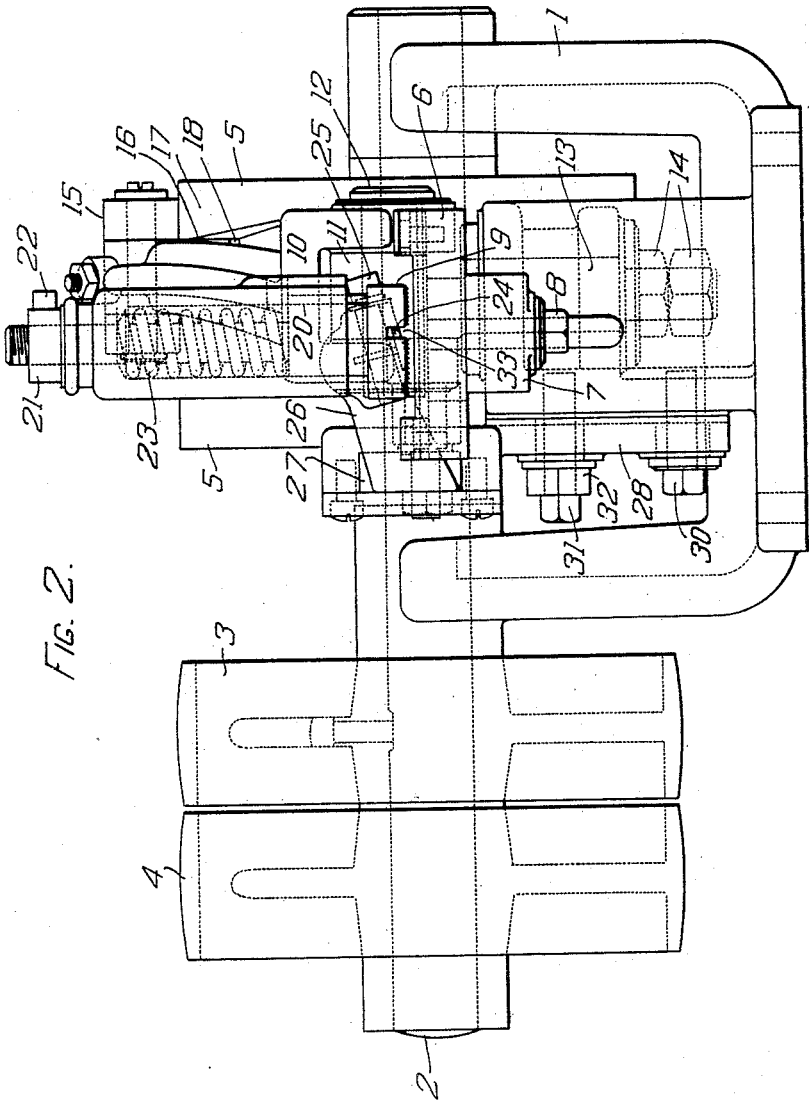

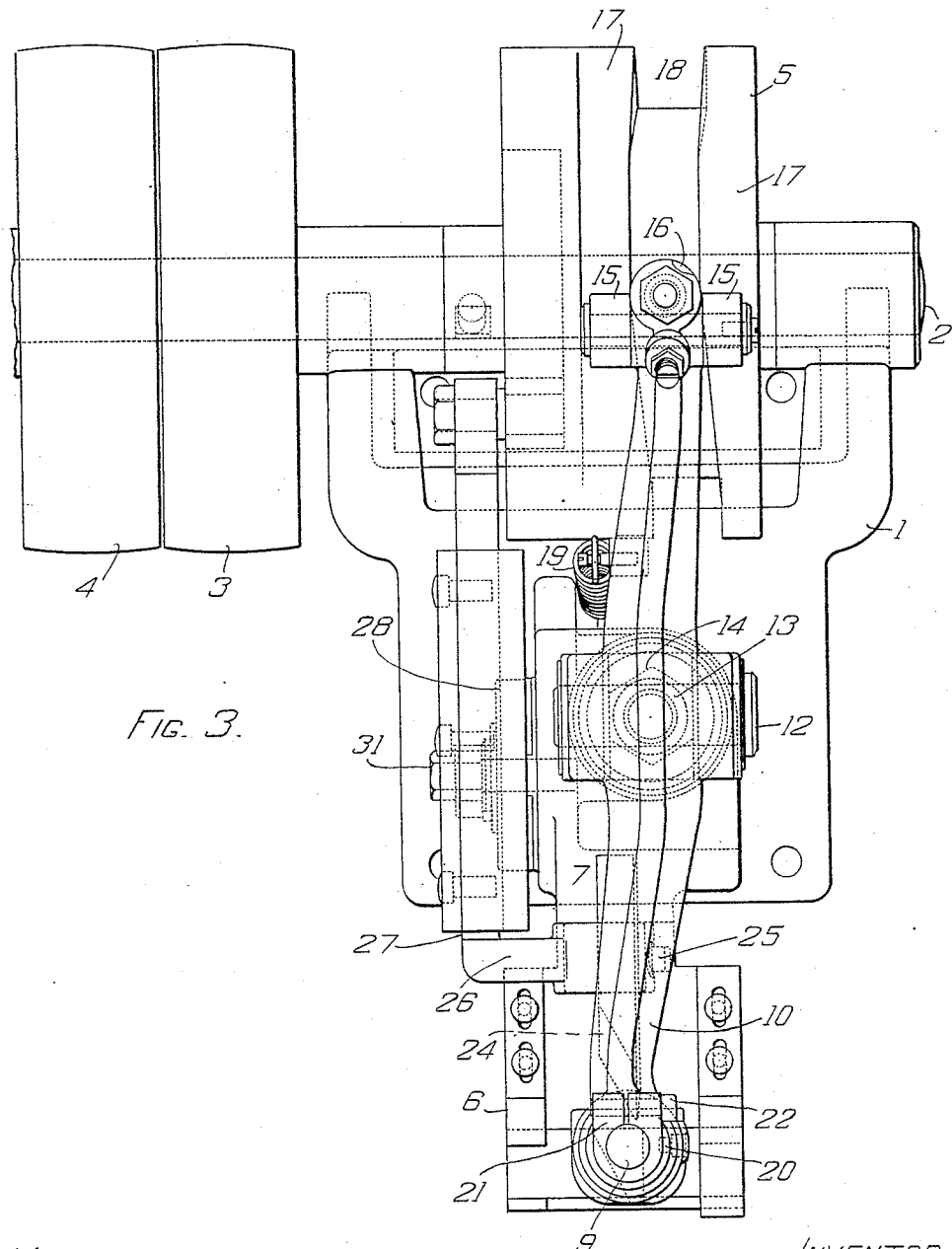

J. B. HADAWAY.
MACHINE FOR OPERATING UPON WELTS.
APPLICATION FILED FEB. 7, 1906.
963,708.
Patented July 5, 1910.
5 SHEETS—SHEET 4.
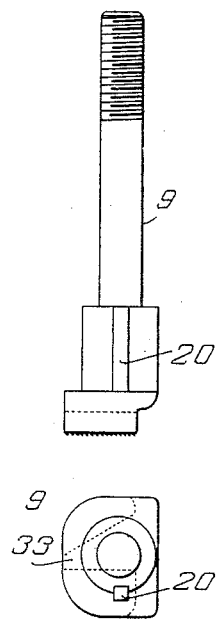
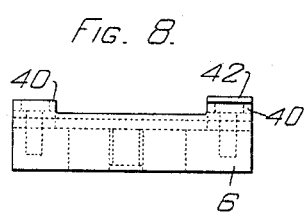
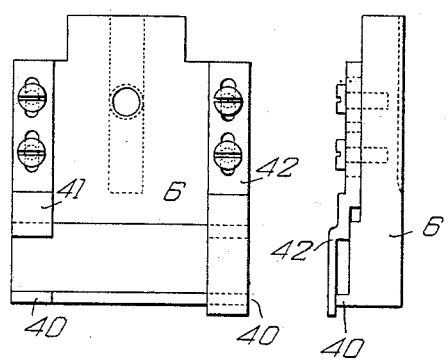
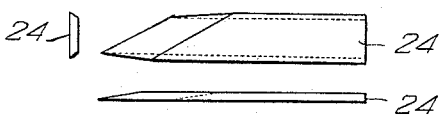
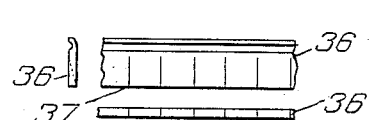
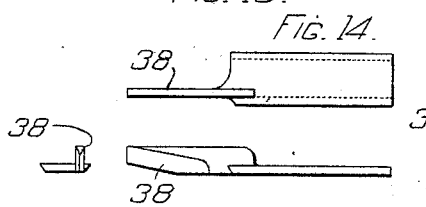
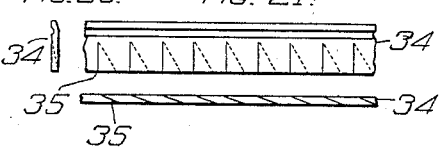
WITNESSES
Alfred H. Hildreth
Farnum F. Dorsey
INVENTOR
John B. Hadaway
by his Attorneys
Phillips Van Everen & Fish

J. B. HADAWAY.
MACHINE FOR OPERATING UPON WELTS.
APPLICATION FILED FEB. 7, 1906.

963,708.

Patented July 5, 1910.
5 SHEETS—SHEET 5.

WITNESSES
Alfred H. Hildreth
Farnum F. Dorsey

INVENTOR
John B. Hadaway
by his Attorneys
Phillips Van Everen & Fish

UNITED STATES PATENT OFFICE.

JOHN B. HADAWAY, OF BROCKTON, MASSACHUSETTS, ASSIGNOR TO UNITED SHOE MACHINERY COMPANY, OF PATERSON, NEW JERSEY, A CORPORATION OF NEW JERSEY.

MACHINE FOR OPERATING UPON WELTS.

963,708.            Specification of Letters Patent.      Patented July 5, 1910.

Original application filed May 26, 1902, Serial No. 109,018. Divided and this application filed February 7, 1906. Serial No. 299,878.

*To all whom it may concern:*

Be it known that I, JOHN B. HADAWAY, a citizen of the United States, residing at Brockton, in the county of Plymouth and State of Massachusetts, have invented certain new and useful Improvements in Machines for Operating Upon Welts; and I do hereby declare the following to be a full, clear, and exact description of the invention, such as will enable others skilled in the art to which it appertains to make and use the same.

The present invention relates to machines for operating upon welts of boots and shoes, and particularly to a machine for operating upon a welt before it is applied to a boot or shoe, or upon a strip of leather which is to be used as a welt, the term "welt strip" hereinafter used in the specification and claims being intended to include any strip of leather adapted to be used as a welt for a welted boot or shoe, or adapted to be formed into such a welt.

In the manufacture of welted boots and shoes it is necessary, after the welt has been secured to the upper and insole, to subject the welt to the action of a beating-out machine in order to cause the welt to lie flat in substantially the plane of the insole. To cause the welt to lie flat, the outer edge of the welt must be stretched considerably, especially at the toe portion of the shoe, and to accomplish this result it is necessary to subject the portion of the welt at the toe of the shoe to the action of the welt beating machine a number of times, and in many instances to slit the welt to relieve the strain upon its outer edge, the slits being formed in the under side of the welt and extending partially through the thickness of the welt so as not to mar the appearance of the welt in the completed shoe.

Heretofore the operation of slitting the welt has been performed after the welt has been attached to the shoe, the slits being usually formed by the operator with a hand knife. In an application filed May 26, 1902, Serial No. 109,018, I have disclosed and claimed a machine for operating on welts either before or after attachment to a shoe, said machine being adapted by certain changes in the construction and arrangement of the parts which support and guide the work to form slits in the under surface of a welt strip or the under surface of a welt after having been attached to a shoe. The present application is a division of said application, and the invention disclosed herein has for its object to provide a machine for operating on a welt strip so as to render the strip flexible and enable the strip to be readily beaten out flat after being attached to the shoe, without the necessity of slitting the welt after the shoe leaves the welt sewing machine.

With this object in view, the invention broadly considered contemplates the provision in a machine for operating upon welts, of means for guiding and supporting a welt strip, and cutting mechanism coöperating therewith to make transverse cuts in one face of said strip less in depth than the thickness of the welt and less in width than the width of the welt. The cuts which are made in the under surface of the welt strip may be of any desired shape and arranged in any desired manner so as to render the welt strip flexible for easy attachment to the shoe and enable the welt to be easily beaten out flat. To avoid weakening the welt, however, the cuts are preferably in the form of slits, and also the slits are preferably formed so as to be obliquely disposed to the surface of the welt, the advantage of having the slits obliquely disposed to the surface of the welt being that thereby more of the material of the welt is cut than is the case when the slits extend at right angles to the surface and the welt is more easily beaten out after being attached to the shoe. Also, the stretching of the welt during the welt beating operation does not widen the slits to form slots in the welt, the portions of the welt on each side of the slits sliding over each other as the welt stretches without widening the slits.

The invention contemplates the provision of any suitable means for guiding and supporting the welt strip and any suitable cutting mechanism which will coöperate therewith to form cuts in the under surface of the welt. In the best form of the invention which has yet been devised, however, the cutting mechanism comprises a cutter having a blade which acts intermittently on the welt strip, and the means for guiding and supporting the welt strip consists of a holder, substantially embracing the strip, through which the welt passes, and which is so arranged with relation to the blade of the cutter that the blade, at each actuation, makes a cut of the desired length and depth in one surface of the welt. In the preferred embodiment of the invention, also, means are provided for automatically feeding the welt strip to space the cuts made by the cutting blade. Means are also provided whereby the length and depth of the cuts may be varied as desired.

In addition to the features of invention above referred to, the present invention also consists in certain devices, combinations and arrangements of parts hereinafter described and claimed, the advantages of which will be obvious to those skilled in the art from the following description.

The several features of the invention will be clearly understood from an inspection of the accompanying drawings, in which—

Figure 24:
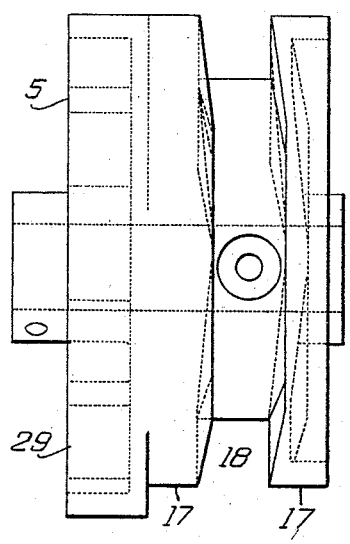
Figure 25:
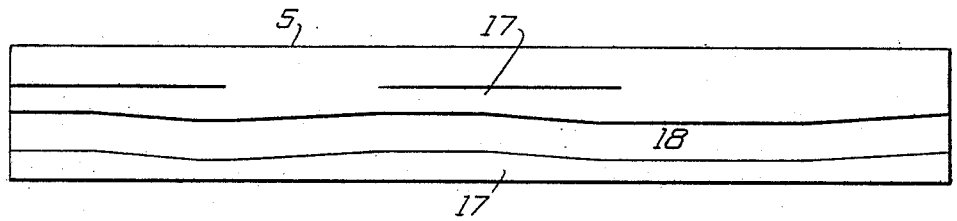

Figure 1 is a view in side elevation of a machine embodying the same in their preferred form; Fig. 2 is a view in front elevation and Fig. 3 is a plan view of the machine illustrated in Fig. 1; Figs. 4 and 5 are views in side and front elevation of the welt clamping and feeding plunger; and Figs. 6 and 7 are top and bottom plan views thereof; Figs. 8, 9 and 10 are views in front elevation, plan and side elevation of the work support detached from the machine; Figs. 11, 12 and 13 are views in end elevation, plan and side elevation of one form of welt slitting knife, the knife illustrated being that shown in Figs. 1, 2 and 3, and being adapted to form slits in the welt obliquely disposed to the surface of the welt; Figs. 14, 15 and 16 are views in plan, end elevation and side elevation of a modified form of knife; Figs. 17, 18 and 19 are views in end elevation, plan and side elevation, of a welt strip provided with slits disposed at right angles to the surface of the welt; Figs. 20, 21 and 22 are similar views of a welt strip provided with slits disposed obliquely to the surface of the welt; Figs. 23 and 24 are face and edge views of the cam disk; and Fig. 25 is a development of the cam disk.

1 indicates the frame of the machine, which may be secured to any suitable support.

2 indicates the cam shaft journaled in bearings in the rear portion of the machine frame and provided at one end with fast and loose pulleys 3 and 4, and having secured thereto between its bearings the cam disk 5.

At the front of the machine frame is a work support 6 which is mounted upon a forwardly projecting arm 7 of the machine frame so as to be adjustable horizontally by means of a bolt 8 passing through a slot in the arm 7 and screwing into the work support, the purpose of this adjustment being to enable the length of the cuts made in the welt strip to be varied, as will be hereinafter described. The work support is illustrated separately in Figs. 8, 9 and 10, and, as therein shown, is provided with upturned guiding lugs 40 which, with guides 41 and 42 adjustably secured to the support, form a guideway for the welt strip. Located above the work support 6 is a plunger 9, the lower surface of which is parallel with the surface of the work support, the arrangement of the work support and plunger being such that these parts, in connection with the guides 40, 41 and 42, form in effect a holder provided with a passage way conforming in shape and size to the welt strip and substantially embracing the strip. The plunger 9 is mounted in the forward end of a lever 10 which lever is provided intermediate its ends with two downwardly projecting lugs between which a block 11 is received and to which the lever is pivoted by means of a pivot pin 12 passing through the downwardly projecting lugs of the lever and through the block. The block 11 is secured to or formed integral with a vertical stud 13 mounted to rotate in suitable bearings in the frame of the machine and held from vertical movement by means of locking nuts 14 upon the lower screw-threaded end of the stud. The stud 13 forms a vertical pivot about which the lever 10 is swung horizontally and the pivot pin 12 forms a horizontal pivot about which the lever 10 is swung vertically. To the rear end of the lever 10 are secured cam rolls 15 and 16 mounted upon horizontal and vertical studs respectively. The cam rolls 15 rest against the cam surfaces 17 formed on the disk 5 and the roll 16 engages a cam groove 18 formed in the peripheral surface of the disk. The rolls 15 are maintained in contact with the cam surfaces 17 by means of a coiled spring 19, one end of which is connected to the rear end of lever 10 and the other end to the frame of the machine. By means of the cam surfaces 17 and the cam groove 18 vertical and horizontal oscillating movements are imparted to the lever 10 to actuate the plunger 9 to clamp and feed the welt as will be hereinafter described. The cylindrical shank of the plunger 9 is mounted to slide in bearings in the forward end of the lever 10 and is held from rotation by means of a key 20 on the enlarged lower end of the shank of the plunger and a coöperating groove in the lever. The shank of the plunger extends above the end of the lever 10 and at its upper end is provided with a split nut 21 having a screw-threaded engagement therewith and being clamped thereto by means of a clamping bolt 22. A coiled spring 23 surrounds the shank of the plunger and is interposed between the upper end of the recess formed in the end of the lever 10 to receive the spring and the shoulder formed by the enlarged lower portion of the shank so that the plunger is yieldingly supported on the lever. The downward movement of the plunger under the influence of the spring 23 is limited by the nut 21, the position of which on the shank of the plunger can be adjusted as desired. This adjustment of the plunger, as will be obvious, adjusts the passage in the holder formed by the plunger and work support for welt strips of different thicknesses.

The welt slitting knife is indicated at 24. The knife is provided with a flat shank which is secured by means of a clamping bolt 25 in a socket in an arm 26 projecting laterally from a slide 27 mounted to reciprocate in horizontal guideways on a plate 28 secured to the frame of the machine. The rear end of the slide 27 is provided with a roll or stud which engages a cam groove 29 in one face of the cam disk 5. The arrangement of the knife 24 and slide 27 is such that the knife reciprocates transversely to the line of feed in substantially the plane of the welt and the cutting blade of the knife is so arranged with relation to the upper surface of the work support 6 upon which the welt is supported that the slits formed in the welt by the knife extend partially through the welt from one surface toward the other and are obliquely disposed to the surface of the welt. In order to vary the depth of the slits the knife 24 is adjusted vertically and as a means for effecting such adjustment the plate 28 in which the slide 27 is mounted is provided with a guide groove which is engaged by a guiding projection on the frame of the machine as is clearly shown in Fig. 3 and is also provided with slots, the lower of which is arranged vertically and the upper of which is arranged horizontally. Through the lower of these slots a bolt 30 passes and screws into the frame of the machine. Through the upper slot a similar bolt 31 passes and screws into the frame of the machine, and upon this bolt is rotatably mounted an eccentric 32, which engages the upper and lower edges of the slot. The plate 28 is clamped to the frame by means of the bolts 30 and 31 and by loosening the bolts and rotating the eccentric 32 the plate can be raised or lowered to adjust the knife to cut slits of any desired depth.

The manner in which the horizontal adjustment of the work support 6 varies the length of the cuts formed in the welt will now be clearly understood, as it will be obvious that an adjustment of the work support in a horizontal plane toward or from the welt slitting knife will produce a corresponding variation in the length of the cuts made by the knife in the welt strip. A variation in the length of the cuts made by the knife can also be effected by adjusting the knife horizontally in the arm 26 of the slide 27.

The operation of the machine above described is as follows: Starting with the parts in the position indicated in Figs. 1, 2 and 3 in which position the plunger 9 is down and at the limit of its movement to the right as viewed in Figs. 2 and 3, as the disk 5 rotates in the direction indicated by the arrow the lever 10 is actuated by the cam groove 18 to move the plunger 9 to the left, feeding the welt over the support 6. At the end of the feeding movement and while the welt is held clamped between the plunger and work support the knife 24 is advanced by the action of the cam groove 29 and caused to cut a slit in the welt. The knife is arranged in line with the plunger and in order to allow the knife to slit the welt the plunger is provided with a recess 23 in its working face to receive the knife. During the cutting stroke of the knife the welt is held clamped between the plunger and work support and is thus supported against the thrust of the knife. In order to enable the plunger to engage the welt and feed it with certainty, its lower face is corrugated as indicated in Figs. 4, 5, and 7. After the slit has been formed in the welt the lever 10 is actuated by the spring 19 to raise the plunger from the welt and is actuated by the cam groove 18 to return the plunger to its extreme position at the right, these movements taking place simultaneously so that the plunger moves diagonally upward. At the same time the cam groove 29 acts to withdraw the knife from the welt. By causing these movements to take place simultaneously instead of successively, the time required for these movements is decreased and the speed of the machine is correspondingly increased. The lever 10 is then actuated by the cam surface 17 to bring the plunger 9 in contact with the welt and is actuated by the cam groove 18 to cause the plunger to again feed the work and to raise the plunger and return it to its extreme position at the right. The lever 10 is then again actuated by the cam surface 17 to bring the plunger in contact with the welt, thus completing the cycle of operations of the machine.

The advantages secured by forming slits in the welt which are obliquely disposed to the surface of the welt will be obvious from an inspection of Figs. 20, 21 and 22, in which 34 indicates a welt strip provided with slits 35 obliquely disposed with relation to the surface of the welt. From these figures it will be evident that when the outer edge of the welt is stretched the portions of the welt above and below the slits will slide over each other and can be compressed during the welt beating operation so that no open slots will be left in the welt.

It will also be evident that when the slits are formed as indicated in Figs. 20, 21 and 22, the welt strip can be fed through the welt guide of a welt sewing machine without any liability of the edges of the slits catching on the guide. The form of the slit 35 illustrated in Figs. 20, 21 and 22 is that produced by the slitting knife illustrated in Figs. 11, 12 and 13. It will be seen that the bottom of this slit extends in a straight line from the grain surface of the welt at the outer edge to the flesh surface of the welt at a point near the stitch receiving groove. It will be evident, however, that by changing the shape of the cutting edge of the knife the bottom of the slit for the greater portion of its length might be made to extend more nearly parallel with the grain surface of the welt.

While I consider it preferable for the reasons hereinbefore stated to use a knife which is adapted to form slits in the welt obliquely disposed to the surface of the welt, it will be obvious that a knife adapted to form slits in the welt disposed at right angles to the surface of the welt might be employed. The form of slits formed in the welt in such case is indicated in Figs. 17, 18, and 19, in which figures 36 indicates a welt strip provided with slits 37 disposed at right angles to the surface of the welt. In the particular form of slit indicated in these figures, the bottom of the slit extends in a straight line from the grain surface of the welt at the outer edge to the flesh surface of the welt at a point near the groove in the welt.

It will be evident that the blade of the knife can be arranged at any desired angle with relation to its shank so that the slits produced in the welt may be disposed at right angles to the surface of the welt or at any desired angle of inclination. In the modified form of knife illustrated in Figs. 14, 15, and 16, the cutting blade 38, instead of being arranged in the same plane with the flat shank as illustrated in Figs. 11, 12 and 13, is arranged at right angles to the shank.

Having thus indicated the nature and scope of my invention and having described a machine embodying the preferred form thereof, I claim as new and desire to secure by Letters Patent:

1. A machine for operating on welts, having, in combination, means for feeding and holding a welt strip, and means coöperating therewith for making transverse cuts in one face of said strip less in length than the width of the strip.

2. A machine for operating on welts, having, in combination, means for feeding a welt strip, and automatic cutting mechanism for making a series of transverse cuts in one side of said welt, less in depth than the thickness of the welt and less in length than the width of the welt.

3. In a machine of the kind described, a holder for a welt-strip, a cutter coöperating therewith for cutting said strip, said holder having a passage conforming in shape and size to the welt-strip and substantially embracing the strip, said passage being adjustable for different thicknesses of strips.

4. A machine for operating on welts, having, in combination, a holder for a welt-strip, a cutter coöperating therewith for making transverse cuts in one face of said strip less in length than the width of the strip, and means for varying the depth of the cuts formed.

5. A machine for operating on welts, having, in combination, a holder for a welt-strip, a cutter having a blade acting intermittently on and transversely cutting said strip on one side at intervals of its length, and means for varying the position of said holder with relation to said cutter to change the length of the cuts.

6. A machine for operating on welts, having, in combination, a holder for a welt-strip, a cutter coöperating therewith for cutting said strip, said holder substantially embracing said strip, and means for varying the position of said holder with relation to said cutter.

7. In a machine of the kind described, a holder for a welt-strip, a cutter coöperating therewith for cutting said strip, said holder being adjustable for different thicknesses of strips, and also adjustable toward and from said cutter.

8. In a machine of the kind described, a holder for a welt-strip comprising two parts and means for adjusting the same toward and from each other for different thicknesses of strips, one part having a slotted portion for engaging the outer side of the welt, and a cutter for operating in said slot on said welt.

9. In a machine of the kind described, a holder for a welt-strip, a cutter coöperating therewith for making transverse cuts in one face of said strip, and means for varying the length of the cuts.

10. In a machine of the kind described, a holder for a welt-strip, a cutter coöperating therewith for making transverse cuts in one face of said strip, and means for varying the location of said cuts toward and from the edge of said strip.

11. A machine for operating on welts, having in combination mechanism for making a series of transverse cuts in one side of a welt-strip less in depth than the thicknesses of the welt and less in length than the width of the welt, and welt guiding and supporting means arranged to guide the welt to the cutting mechanism and support the welt during the action of the cutting mechanism thereon.

12. A machine for operating on welts, having, in combination, means for guiding and supporting a welt-strip, cutting mechanism coöperating therewith to make transverse cuts in one face of said strip less in length than the width of the strip, and means for varying the depth of the cuts.

13. A machine for operating on welts, having, in combination, means for guiding and supporting a welt-strip, cutting mechanism coöperating therewith to make transverse cuts in one face of said strip, and means for varying the length of the cuts, 14. A machine for operating on welts, having, in combination, means for guiding and supporting a welt-strip and cutting mechanism coöperating therewith to make transverse slits in one side of said strip obliquely disposed to the surface of the strip and less in length than the width of the strip.

15. A machine for operating on welts, having, in combination, means for guiding a welt-strip, cutting mechanism arranged to make transverse slits in one face of said strip obliquely disposed to the surface of the strip and less in length than the width of the strip and means for feeding the strip to space the slits made by the cutting mechanism.

In testimony whereof I affix my signature, in the presence of two witnesses.

JOHN B. HADAWAY.

Witnesses:
 FRED O. FISH,
 ALFRED H. HILDRETH.